United States Patent
Petrou et al.

(10) Patent No.: US 11,603,936 B2
(45) Date of Patent: Mar. 14, 2023

(54) THROUGH BORE SLIP RING CONDITION MONITORING SYSTEM AND METHOD

(71) Applicant: Deublin Company, LLC, Waukegan, IL (US)

(72) Inventors: Anton A. Petrou, Hawthorn Woods, IL (US); Lu Han, Vernon Hills, IL (US); Matt Jakymiw, Park Ridge, IL (US)

(73) Assignee: Deublin Company, LLC, Waukegan, IL (US)

( * ) Notice: Subject to any disclaimer, the term of this patent is extended or adjusted under 35 U.S.C. 154(b) by 356 days.

(21) Appl. No.: 16/869,200

(22) Filed: May 7, 2020

(65) Prior Publication Data

US 2020/0355272 A1 Nov. 12, 2020

Related U.S. Application Data

(60) Provisional application No. 62/846,306, filed on May 10, 2019.

(51) Int. Cl.
*H02K 5/14* (2006.01)
*F16J 15/34* (2006.01)

(52) U.S. Cl.
CPC .......... *F16J 15/3492* (2013.01); *H02K 5/141* (2013.01); *H02K 2203/03* (2013.01)

(58) Field of Classification Search
CPC ............................. H02K 5/14; H02K 2203/03
See application file for complete search history.

(56) References Cited

U.S. PATENT DOCUMENTS

| | | | |
|---|---|---|---|
| 8,159,102 B2 * | 4/2012 | Yoshikawa | H02K 11/225 310/68 B |
| 2008/0111434 A1 | 5/2008 | Head | |
| 2012/0115335 A1 | 5/2012 | Yamamoto et al. | |
| 2015/0061705 A1 | 3/2015 | Angerpointner et al. | |
| 2016/0118867 A1 | 4/2016 | Iwata et al. | |
| 2018/0248441 A1 | 8/2018 | Bock | |

FOREIGN PATENT DOCUMENTS

| | | |
|---|---|---|
| EP | 2 658 101 A1 | 10/2013 |
| GB | 2 431 294 A | 4/2007 |
| WO | WO 2008/148583 A1 | 12/2008 |

OTHER PUBLICATIONS

International Patent Application No. PCT/US2020/031913, International Search Report (dated Aug. 11, 2020).

* cited by examiner

*Primary Examiner* — Dang D Le
(74) *Attorney, Agent, or Firm* — Leydig, Voit & Mayer, Ltd.

(57) ABSTRACT

A slip ring assembly includes a housing having a stator that rotatably supports a rotor. The rotor includes conductive disks that are electrically connected to respective conductors extending through a rotor shaft. The stator includes brushes that slidably and electrically engage the conductive disks. The one or more brushes are electrically connected to stator conductors extending at least partially through the stator. Electrical pathways are defined and extend from the stator conductors, the brushes, the conductive disks, and the respective conductors in the shaft. A smart board is connected to the stator and includes electronic components configured to monitor operation of the slip ring assembly and provide signals to an external source. The smart board is electrically connected to, and powered by, electrical power that is present and available on the stator conductors.

17 Claims, 6 Drawing Sheets

THROUGH BORE SLIP RING CONDITION MONITORING SYSTEM AND METHOD

CROSS-REFERENCE TO RELATED APPLICATIONS FILED

This patent application claims priority to U.S. Provisional Patent Application Ser. No. 62/846,306, filed on May 10, 2019, which is incorporated herein in its entirety by this reference.

BACKGROUND OF THE INVENTION

A slip ring is an electromechanical device that includes one or more electrical connections, conduits or pathways operating to communicate electrical current or voltage between a stationary device and a rotating device. Slip rings, which are also known as rotary electrical connectors or rotary electrical joints, typically are configured to freely rotate during operation. A slip ring can be used to transfer one electrical conduit between stationary and rotating devices. Slip rings are also sometimes stacked or combined into assemblies so that multiple electrical conduits may be transferred across a rotating interface simultaneously.

Due to the function they provide, slip rings are typically used in various applications, including revolving automation or control systems such as turntables, index tables, and robots. Wind turbines, semiconductor processing, printing plastic molding, CT and MRI medical scanners, satellite communications, beverage processing, and industrial washers are also common slip ring applications.

In a typical configuration, electrical slip rings work by holding a sliding contact (brush) against a ring (conductor ring). One part, typically the brush, is stationary while the other, typically the conductor ring, rotates. When conductor rings are stacked to provide multiple channels, insulative rings may be interposed between adjacent conducting rings. Lead wires to the brush and conductor ring terminate internally and provide electrical connections to devices on either side of the slip ring. In general, conductor rings are mounted on the rotor and terminated with lead wires that run axially through the rotor to one end. Brushes are secured by a brush holder that is mounted to the housing. A set of ball bearings inside the housing supports the rotor. A cover and endcaps enclose the device. Structural components like the housing, rotor, cover, and endcaps are made of metallic and non-metallic materials selected based on application requirements such as temperature, weight, size, ruggedness, and cost. Electrical components such as the brushes, conductor rings, and electrical connectors, are usually made of conductive materials selected based on their functional requirements such as current density, voltage drop, rotational speed, temperature, resistance variation, bandwidth, characteristic impedance, and the like.

BRIEF SUMMARY OF THE INVENTION

The present disclosure describes systems and methods for sensing a health state of a slip ring assembly. In one embodiment, a board containing thereon various electrical and electronic components and sensors is mounted internally to the slip ring assembly, and operates to collect, process and transmit data indicative of an operating condition of the slip ring to a receiver, which can be used to monitor the operation and operating state of the slip ring. Advantageously, in one embodiment, the electrical and electronic components of the board are powered by electrical power that is provided by a power source. The power source can be internal, for example, by a battery or transferred through the slip ring such that no external power source is required, or external, for example, through a wired power connection. The board may provide raw or processed operating data of the slip ring assembly, and can also diagnose and transmit fault conditions, both of the slip ring assembly as well as of components of the board itself. Communication is carried out wirelessly, for example, via a Bluetooth or near field communications, or via a wired connection. The board may also provide a visual indication of the operating state of the board and/or the slip ring assembly externally to the slip ring assembly.

In one embodiment, the board includes a light detector configured to detect presence and intensity of light. The light detector may be disposed adjacent to, or in visual line with, a brush of the slip ring assembly such that, in the event of failure of the brush, which may be manifested by the presence of sparks, the light emitted by sparking can be detected. The board may also include additional sensors such as a temperature sensor, humidity sensor, hall effect sensor, and the like. The hall effect sensor may sense proximity to a magnet disposed onto a rotating ring such that an indication of number and rate of rotations may be monitored. A date processing software included and operating on the board may correlate signals or other information provided by the various sensors to calculate and estimate the health or operating condition of the slip ring assembly. For example, the consistent presence of a spark at a brush over a number of successive rotations may be used to indicate a fault or impending fault of the brush or ring.

BRIEF DESCRIPTION OF THE SEVERAL VIEWS OF THE DRAWING(S)

DETAILED DESCRIPTION OF THE INVENTION

Figure 1:
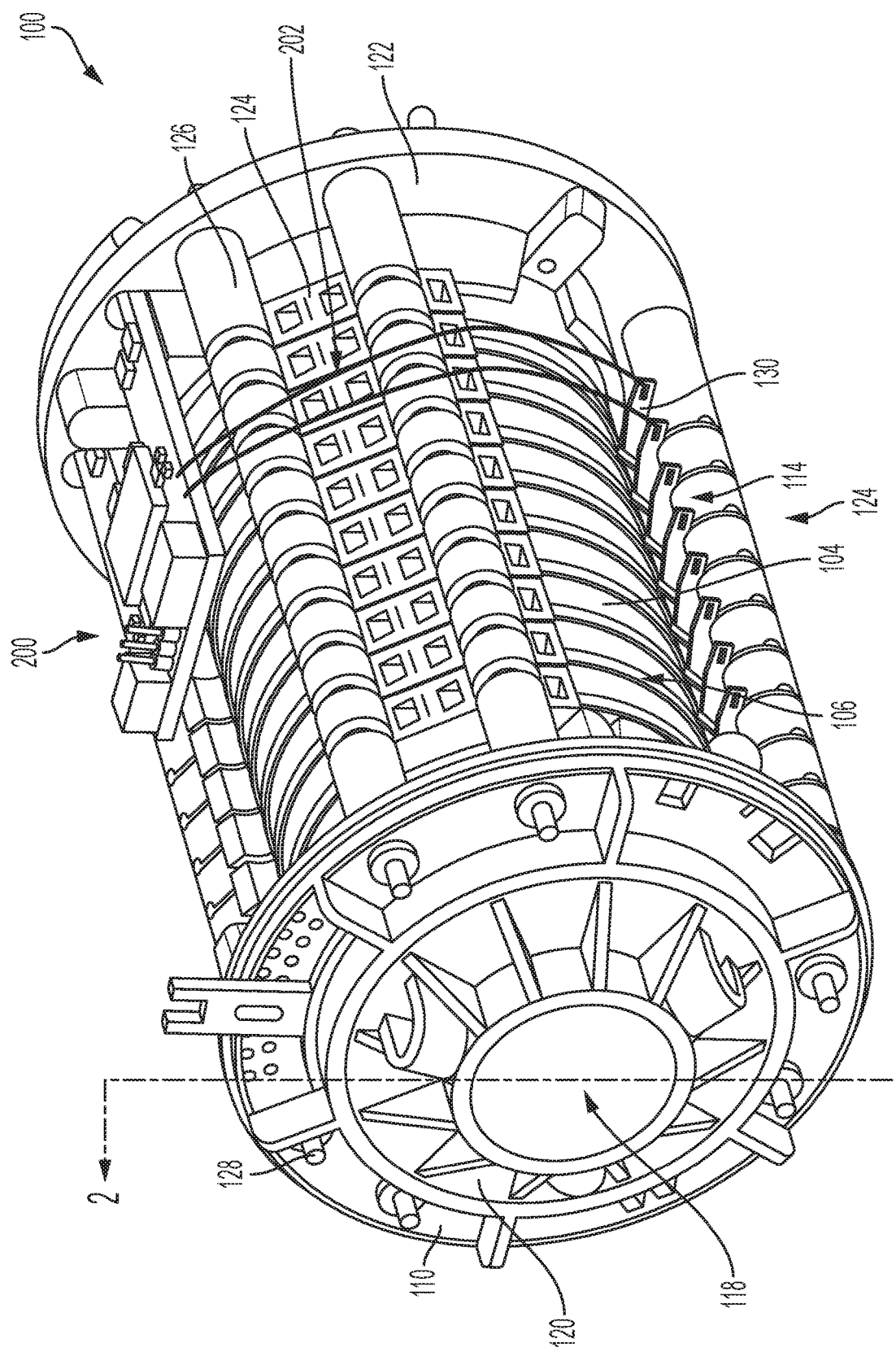
FIG. 1 is an outline view of a slip ring assembly having a sensor board mounted thereon, in accordance with the disclosure, shown with a cover removed to illustrate internal components.
Figure 2:
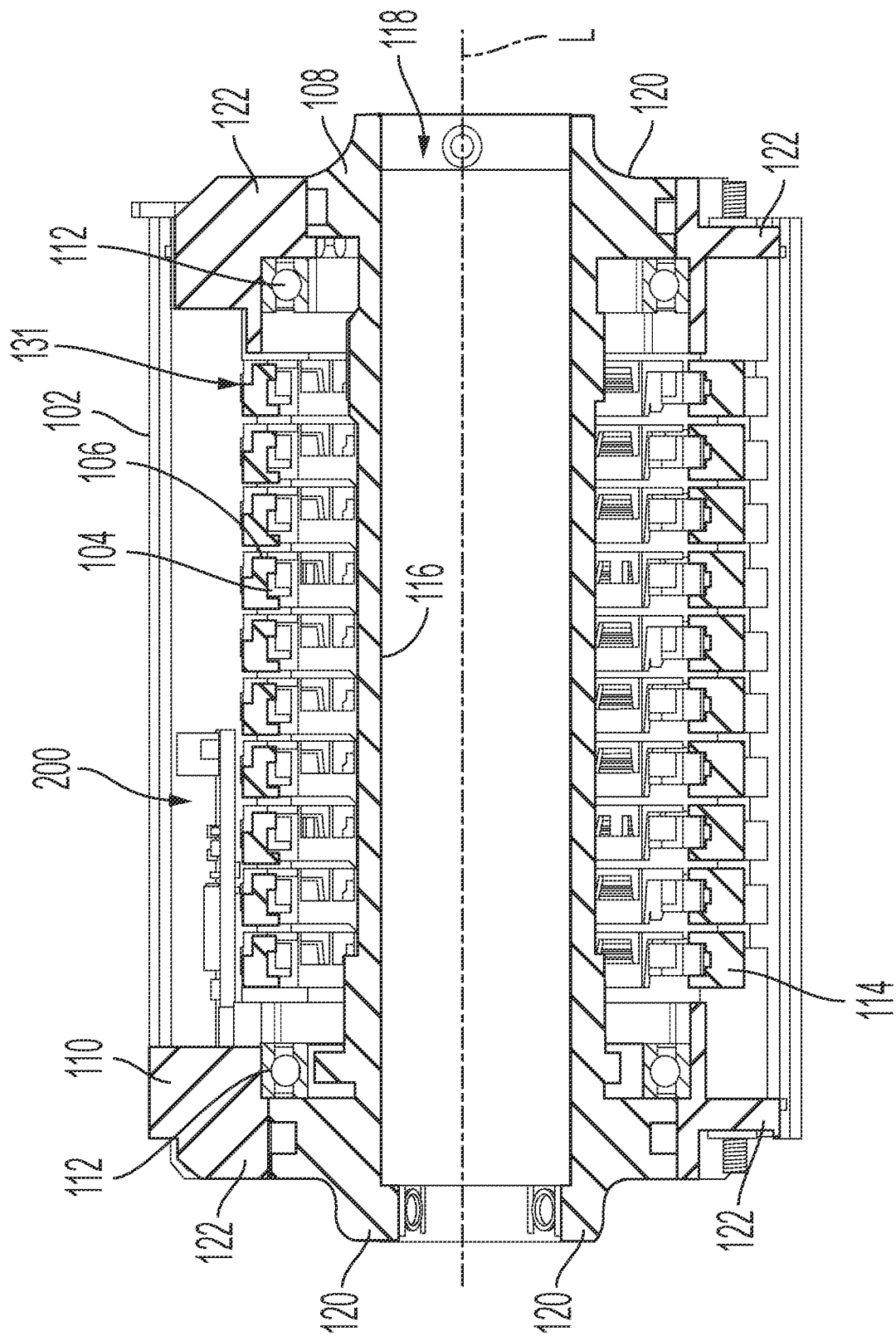
FIG. 2 is a section view through the slip ring assembly of FIG. 1.

An outline view of a slip ring assembly 100 is shown in FIG. 1, and a section view thereof is shown in FIG. 2. The slip ring assembly 100 includes a hollow cylindrical housing 102 (shown in FIG. 2), which is removed in FIG. 1 to illustrate the internal components thereof. In some embodiments, the housing 102 is arranged to seal the internal structures of the slip ring assembly 100 from the environment. In reference to FIGS. 1 and 2, the slip ring assembly 100 includes one or more conductive disks 104 alternatively disposed with insulative disks 106 along a shaft 108. Each conductive disk 104 is electrically connected to a respective conductor that extends through or is integrated with the shaft 108 (now shown) in the typical fashion. A stator 110 includes bearings 112 that rotatably support the shaft 108 therein. The stator 110 further includes brushes 114 that slidably but electrically engage the conductive disks 104. The brushes 114 are electrically connected to stator conductors 131 extending through the stator 110 such that one or more electrical pathways extend from the stator conductors 131, through the brushes 114, through the conductive disks 104 and through the shaft 108 conductors while the shaft 108 is rotating relative to the stator 110, or vice versa.

The shaft 108 and stator 110 may be made from an assembly of different structures. In the illustrated embodiment, the shaft 108 is an assembly of a hollow bar 116 that has a bore 118 extending there through. Hubs 120 are disposed on either end of the hollow bar 116 and are rotatably engaged with the hollow bar 116. Similarly, the stator 110 includes rims 122 that support the housing 102 and the bearings 112. As shown in FIG. 1, The stator 110 includes one or more elongate structures 124 that include bolt runners 126 accommodating bolts 128 there through that support the brushes 114 and other structures that support the disks 104 and 106 along a longitudinal axis L of the slip ring assembly 100. With respect to the conductors of the stator 110, the brushes 114 are connected to taps 130 that extend within the housing 102 and that can be used to electrically connect conductors to the brushes 114.

Figure 3:
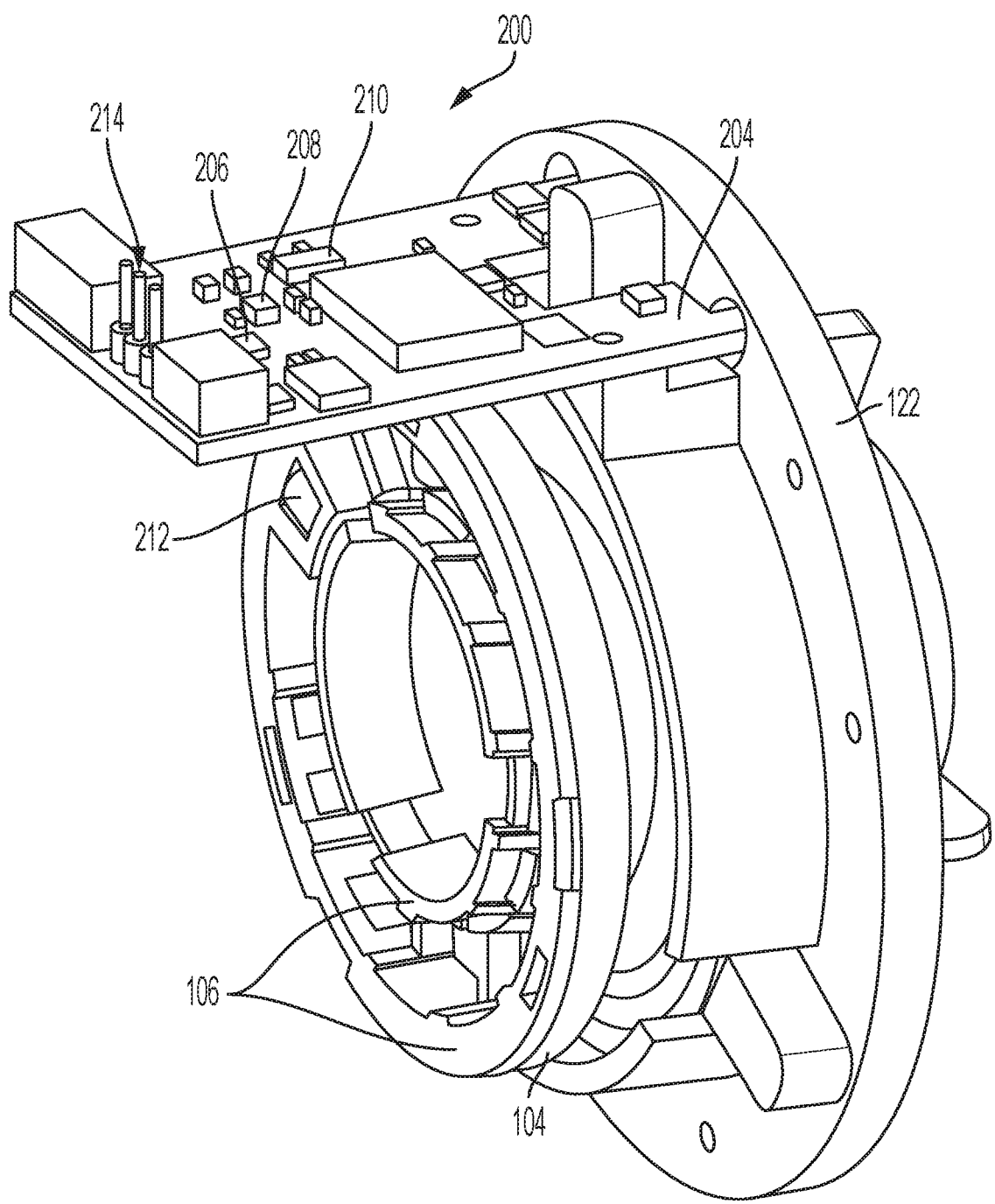
FIG. 3 is a partial outline view of the sensor board mounted on a stationary ring of the slip ring assembly shown in FIG. 1.

In the illustrated embodiment, the slip ring assembly 100 further includes a smart board 200, which is mounted onto a rim 122 of the stator 110 as shown in FIG. 3, and which includes various electronic components that operate to monitor operation of the slip ring assembly 100 and provide various signals to an external source, as will be hereinafter described. The smart board 200 may operate with electrical power provided by a battery or an external power source that can be wired to the smart board 200. In the embodiment illustrated in FIG. 2, a pair of conductors 202 is connected to respective taps 130 that carry an appropriate voltage during operation of the slip ring assembly 100 to thus internally supply power to the smart board 200.

Figure 4:
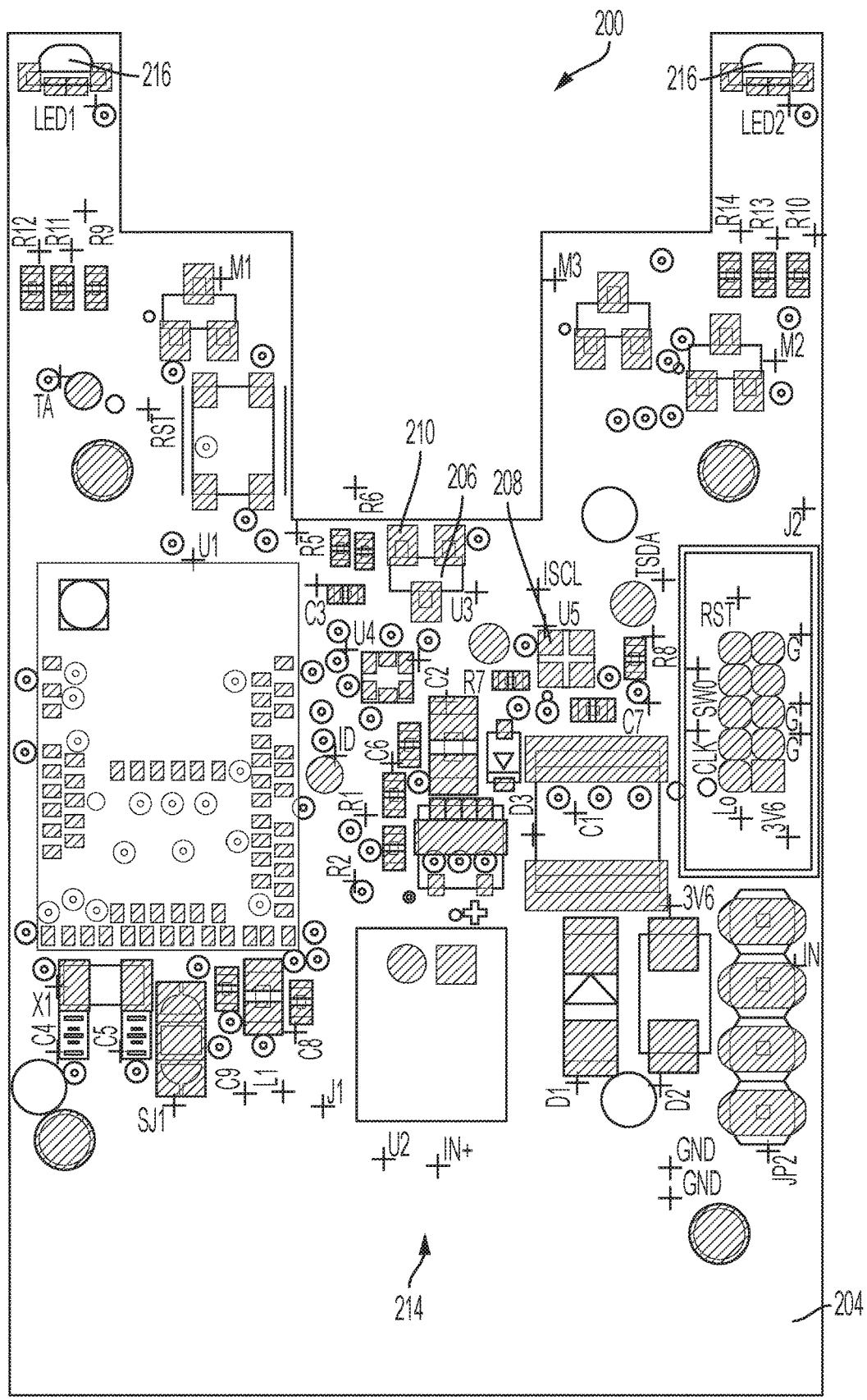
FIG. 4 is an exemplary schematic view of the sensor board of FIG. 1.

An outline view of the smart board 200 mounted onto an end of the stator 110 is shown in FIG. 3, and a diagrammatic view of the smart board 200 is shown in FIG. 4. In reference to these figures, it can be seen that the smart board 200 includes a circuit board 204 onto which various electrical and electronic components are mounted. In the embodiment shown, the smart board 200 includes a magnetic field sensor such as a Hall-effect sensor 206, a temperature and humidity sensor 208, and a spark sensor 210, which is embodied in FIG. 3 as a light sensor that is configured to sense the presence and intensity of light radiation. Additional sensors can also be used and mounted on one side of the circuit board 204 or the other depending on the sensor type and physical proximity or line-of-sight of the sensor with the structures being monitored. For example, in one embodiment, the spark sensor 210 may be an appropriate type of sensor configured to detect ionization or decomposition of the components and materials found within the slip ring assembly 100 that result from, or are produced by or during an arc, which may remain within the slip ring assembly 100 long enough to be detected after occurrence of a spark or arc within the sealed internal space of the slip ring assembly 100. Such materials may include a flash of light emitted in the visible, infrared or ultraviolet spectrums, ozone, oxygen, oxides of nitrogen, particulates and others. Examples of sensors that may be used as the spark sensor 210 include, but are not limited to, City Technology sensor part number 75-153123130659, Amphenol SGX Sensortech SGX-4OX, SPEC Sensors, LLC sensor part number 968-041, Sensirion AG sensor part number SGP30-2.5K, and other similar sensors. The spark sensor 210 may be mounted on the side of the circuit board 204 that faces the brushes.

In the illustrated embodiment, the magnetic field sensor 206 is configured to cooperate with a magnet 212 that is mounted onto an insulative disk 106 and arranged to rotate therewith such that the magnet 212 may pass proximate the magnetic field sensor 206 once per revolution of the shaft 108. Other electronic components may also be disposed onto the circuit board 204. For example, in the illustrated embodiment, the circuit board 204 further includes one or more memory devices such as FRAM memory, a programmable processor, power conditioning circuits, wireless information transmission and receiver circuits, wired power and/or information transmission connectors, a real time clock, and the like. The smart circuit 200 further includes two visual indicators 216, which in the illustrated embodiment are light emitting diodes (LED) that provide, in real time, a visual indication of the operating state of the smart board 200 and are visible externally from the slip ring assembly 100. Power leads 214 are connectable by the conduits 202 to the taps 130 (FIG. 1) to provide electrical power to operate the various sensors and other electronic devices of the smart circuit 200. Additional taps for information transmission, for receiving external power, and the like, may also be used.

To facilitate the wireless transmission of signals to and from the smart board 200, the end caps 110 of the slip ring assembly 100 may be made from an electromagnetically permeable material such as plastic. Further, to provide visual access to the LEDs 216, portions of the housing and/or the end caps 110 may be made from a transparent, translucent or at least opaque material.

Figure 5:
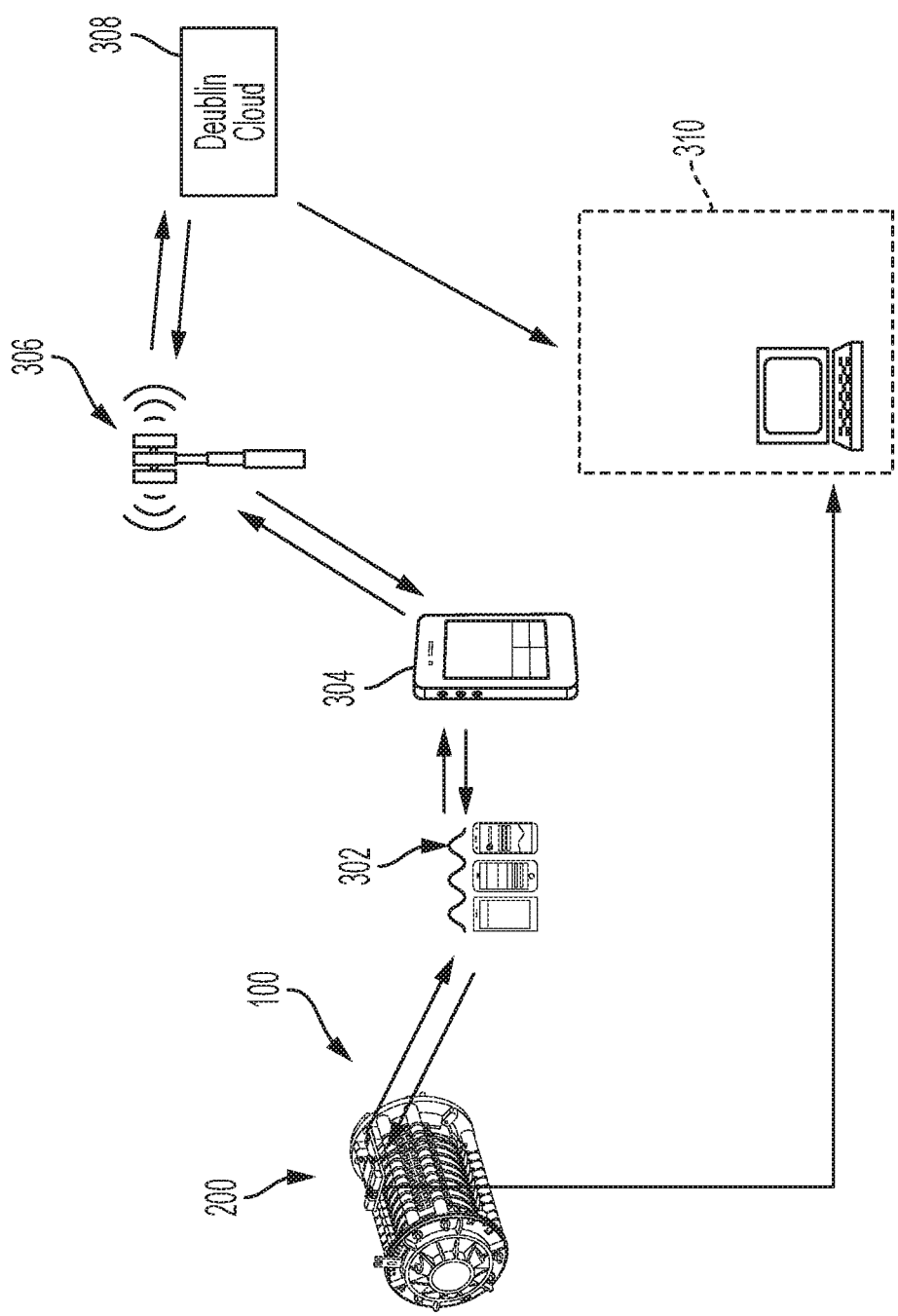
FIG. 5 is a schematic view of a network in accordance with the disclosure.

A schematic view of a network in accordance with the disclosure is shown in FIG. 5. In this embodiment, a slip ring assembly 100 is shown having a smart board 200 thereon. The slip ring assembly 100 may be mounted on or associated with other machinery in a service installation but is shown removed therefrom for simplicity. The smart board 200 may collect and process information from the various internal components of the slip ring assembly 100, as previously described, which is indicative of the operating state and/or the operating state of the slip ring assembly 100. This information may be provided wirelessly either as raw data, processed or filtered data, and/or as a calculated conclusion or estimation about the presence or imminent manifestation of a failure in a component, as will be described hereinafter. This wireless information can be provided as a continuous stream or in discrete packets that are transmitted periodically or intermittently in response to a query. The information may be provided locally to a local computer system 310, or remotely to used devices 302, a cellular gateway 304, the Internet 306, a cloud 308, and the like.

Figure 6:
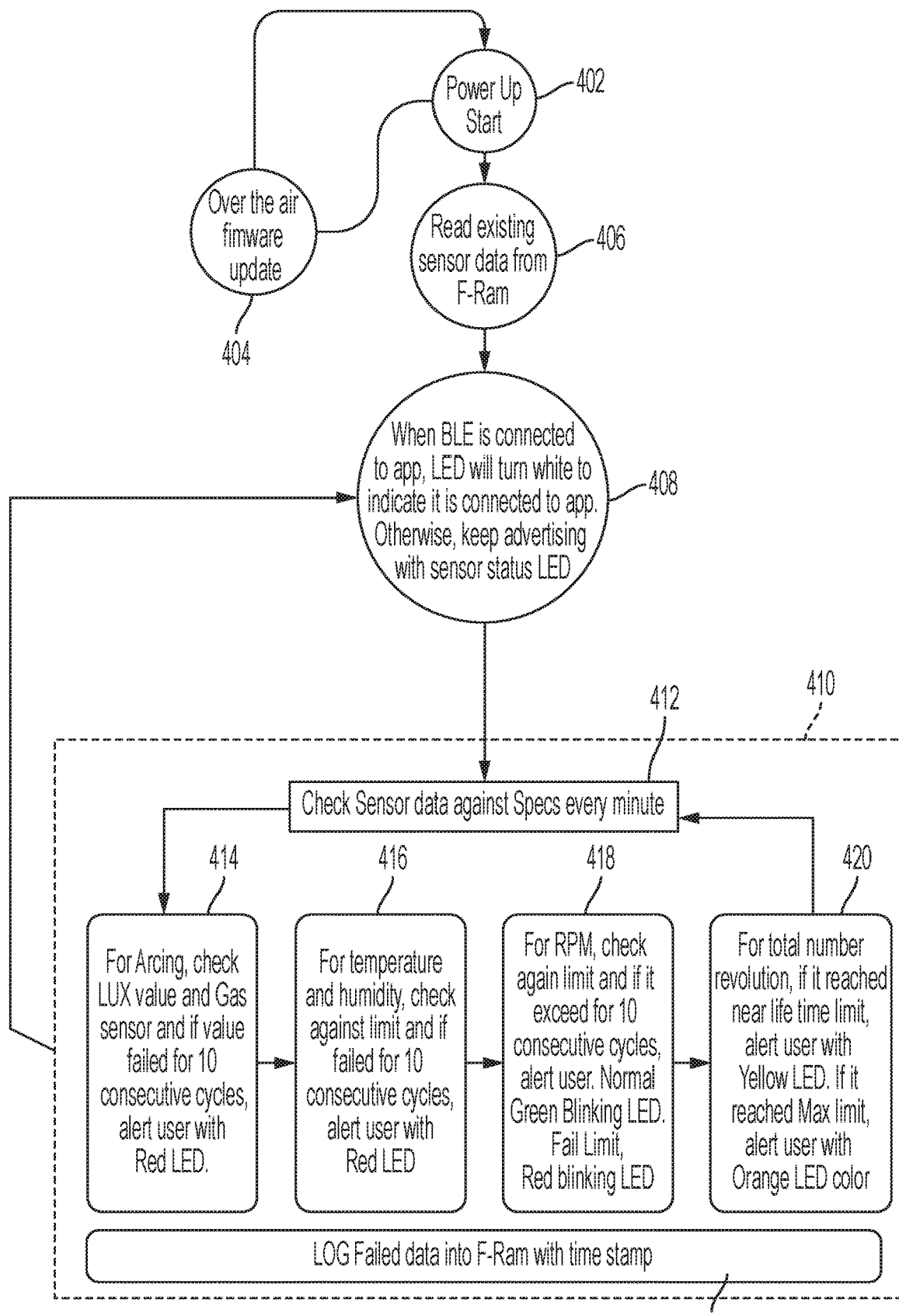
FIG. 6 is a state flow diagram in accordance with the disclosure.

A state flow diagram is shown in FIG. 6 to illustrate an operating scheme for a programmable controller that is included on the smart board 200 and that is disposed to receive sensor signals from the various sensors, process those signals, and provide conclusions or calculated results. In one embodiment, the various operations of the programmable controller are in the form of computer executable instructions that are stored in a memory device and are selectively retrieved and executed by the controller to perform various functions.

In reference to FIG. 6, the state flow initiates at a power up or start condition or state 402. Upon activation, the controller may query for firmware updates at 404. For normal operation using a latest firmware version, the controller may read existing sensor data from a memory device such as an F-RAM device at 406. The controller may then wait for a data connection at 408. During this time, the LEDs 216 may provide a visual indication that the smart board is ready for connection.

Whether a data connection with the controller is established or not with another controller or network for providing data, the controller enters an operating state 410, which can include various tasks and operations. These tasks and operations may be carried out continuously to acquire, process and generate operational data relative to the device. Such data may be stored in the memory device and provided externally to a network when an appropriate connection has been established. In the illustrated embodiment, the controller may begin a data acquisition process, for example, that includes checking sensor data and comparing them to sensor specifications periodically such as every minute to determine whether the sensors are operating within their expected parameters as a way of diagnosing sensor operation at 412 and also for collecting useful data from the device—in this case the slip ring assembly 100—and store that data in a memory device. Having collected sensor data, the controller may carry out various functional tests of the device.

The functional tests may be carried out in parallel or in any sequence. In the exemplary embodiment shown in FIG. 6, the controller may first carry out an arcing test 414 on one or more brushes of the slip ring assembly. During the arcing test 412, the controller may check an illumination sensor and, optionally, a gas sensor such as an ozone sensor, nitrogen oxide sensor, or the like, to determine whether illumination or other arc indicators are present, which indicates the presence of electrical arcing, and also the presence of ozone or another gas that may be produced by the arcing. Additionally, or instead of the illumination or gas sensor, the smart board may further include a particulate sensor that determines presence of particulates within the slip ring assembly housing, which may be an indication of degradation of the brushes or other mechanical components operating within the housing. When presence of one or both of these conditions is detected, i.e., gases and/or particulates, the controller may monitor for a repeat of these conditions for a predetermined number of cycles or rotations of the slip ring assembly such as for 10 cycles. When the conditions are present for the predetermined number of cycles, the controller may determine that a fault is present and provide an appropriate notification signal over a network and also, if available, a visual indication on the device, for example, by illuminating a red visual indicator, or a similar visual and/or audible notification to alert any users present around the operating device.

The controller may further perform a temperature or humidity test at 416, by monitoring signals from temperature and/or humidity sensors at 416. In one embodiment, a temperature increase beyond a predefined temperature limit may indicate that sliding structures and friction may indicate a fault. Regarding humidity, there may be combined devices that carry fluids and electrical signals, which may be experiencing a leak, or there may be external ingress of conductive fluids that have entered the device and may interfere with the electrical signals and power that is transferred thereby. Similar to the arcing test, presence of an increased temperature and/or humidity for a predefined number of cycles such as 10 cycles may prompt the controller to issue a fault condition using signals and/or visual or audible alerts.

The controller may also perform a speed test 418, by monitoring and clocking signals from a magnetic field sensor that senses passage of a magnet mounted onto a rotating ring, as previously described, to determine a rotating speed of the device, for example, expressed in revolutions per minute (RPM). The determined speed may be compared to a maximum speed limit of the device and a green indicator may be illuminated while the device is operating within its design speed, or a red indicator may be illuminated in the event of an over speed. The determined speed may continuously also be provided as a signal on the network to which the controller is connected.

The controller may also monitor the remaining design life of the device at 420, for example, by counting the total number of revolutions of the device during its life and comparing the total number of revolutions with a design target of the device. The number of revolutions may be acquired by using a magnetic field sensor that senses passage of a magnet associated with a rotating disk, as previously described. Based on the total number of revolutions, the controller may illuminate a green light when the number of revolutions is below a limit, yellow when the number of revolutions approaches the limit, and red or orange when the number of revolutions exceeds the limit, which can be an indication that service or replacement of the device is required. These indications can also be provided as signals to a network on which the controller is connected. Failed or incomplete data acquisition by the controller from the various sensors may be logged with a time stamp at 422 to facilitate troubleshooting in the event of a fault.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and "at least one" and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein.

Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. A slip ring assembly, comprising:
a hollow cylindrical housing;
a rotor including one or more conductive disks, the rotor disposed within the hollow cylindrical housing, wherein each of the one or more conductive disks is electrically connected to a respective conductor that extends through at least a portion of the shaft;
a stator connected to the housing, the stator including one or more brushes connected to the stator, the one or more brushes slidably and electrically engaging the one or more conductive disks of the rotor, wherein the one or more brushes are electrically connected to stator conductors extending at least partially through the stator;
wherein one or more electrical pathways are defined and extend from the one or more stator conductors, the one or more brushes, the one or more conductive disks, and the respective conductors in the shaft; and
a smart board connected to the stator, the smart board including electronic components that are configured to monitor operation of the slip ring assembly and provide signals to an external source;
wherein the electronic components of the smart board include a plurality of sensors arranged to monitor operation of the brushes;
wherein the plurality of sensors includes a humidity sensor, a particulate sensor, and a spark sensor; and
wherein the smart board is electrically connected to, and powered by, and electrical power source.

2. The slip ring assembly of claim 1, wherein the housing is arranged to isolate the rotor and the stator from the environment.

3. The slip ring assembly of claim 1, wherein the one or more conductive disks are disposed along the shaft to form a stack, and wherein the slip ring assembly comprises one or more insulative disks disposed alternatingly with the one or more conductive disks in the stack.

4. The slip ring assembly of claim 1, wherein the electrical power source is at least one of a battery disposed on the smart board, electrical power provided by conductors that are connected to at least one of the stator conductors, and electrical power provided by conductors connected between the smart board and a power source that is external to the housing.

5. The slip ring assembly of claim 1, further comprising bearings connected to the stator, the bearings rotatably supporting the shaft within the hollow cylindrical housing.

6. The slip ring assembly of claim 1, wherein the plurality of sensors further includes a magnetic field sensor, and a temperature sensor.

7. The slip ring assembly of claim 1, wherein the spark sensor is a light sensor configured to sense a presence and intensity of light radiation emitted as an electrical arc at one of the one or more brushes.

8. The slip ring assembly of claim 1, wherein the spark sensor is a gas sensor configured to sense a presence of at least one of ozone and oxides of nitrogen within the housing.

9. The slip ring assembly of claim 1, wherein the electronic components of the smart board further include one or more memory devices, a programmable processor, a power conditioning circuit, a wireless information transmission circuit, and a wireless information receiver circuit.

10. The slip ring assembly of claim 9, wherein the electronic components of the smart board further include two visual indicators associated with the programmable processor, the two visual indicators being configured to operate in response to signals from the programmable processor to provide visual information.

11. The slip ring assembly of claim 1, wherein the housing includes end caps, and wherein the end caps are made from an electromagnetically permeable material.

12. A method for operating a slip ring assembly, comprising:
providing a rotor having conductive disks, the conductive disks being electrically connected to rotor conductors disposed at least partially along a shaft of the rotor;
providing a stator having brushes, the brushes electrically and slidably engaging the conductive disks, the brushes being electrically connected to stator conductors disposed at least partially along the stator;
providing a smart board having electronic components thereon including sensors and a programmable logic controller, the smart board being associated with the stator and being electrically connected to, and powered by, power conductors that are electrically associated with the stator conductors either internally or externally relative to the slip ring assembly;
providing a magnet on the rotor and a magnetic field sensor on the stator;
using the smart board to diagnose an operating state of the slip ring assembly, by:
initiating a power up condition of the slip ring assembly;
establishing a data connection between the smart board and an external source;
providing a visual indication of a data connection state of smart board using a visual display on the stator;
acquiring sensor data from the sensors, wherein acquiring sensor data includes sensing a proximity of the magnet to the magnetic field sensor, and processing the proximity of the magnet to the magnetic field sensor as indicative of a revolution of the rotor relative to the stator;
calculating a speed of rotation of the rotor relative to the stator based on signals from the magnetic field sensor,
comparing the speed of rotation with a maximum speed of rotation,
providing a first visual indication using an illumination device disposed on the smart board when the speed of rotation is below the maximum speed of rotation, and
providing a second visual indication when the speed of rotation exceeds the maximum speed of rotation;
comparing sensor data to specifications; and
diagnosing the slip ring assembly based on the sensor data comparison to the specifications.

13. The method of claim 12, wherein acquiring sensor data includes acquiring an indication from a light sensor of whether a flash of light is detected, and diagnosing the detection of a flash of light as a presence of an arc at one of the brushes.

14. The method of claim 12, wherein acquiring sensor data includes acquiring an indication from a gas sensor that presence of a gas is detected, and diagnosing the presence of the gas as a presence of an arc at one of the brushes.

15. The method of claim 14, wherein the gas is one of ozone and an oxide of nitrogen.

16. The method of claim 12, wherein acquiring sensor data includes acquiring an indication from a temperature sensor of an elevated temperature, and diagnosing the elevated temperature as indicative of friction that results from a fault in the rotor or stator.

17. The method of claim 12, further comprising using the programmable controller to:
   count a number of revolutions of the rotor based on signals from the magnetic field sensor,
   compare the number of revolutions with a service life of the slip ring assembly, the service life expressed as a maximum number of revolutions;
   provide a third visual indication using the illumination device while the number of revolutions is below the service life, and
   provide a fourth visual indication using the illumination device when the number of revolutions exceeds the service life.

\* \* \* \* \*